May 1, 1934.        A. E. HANSEN        1,956,615
METHOD OF PRODUCING TOMATO JUICE
Filed April 9, 1931
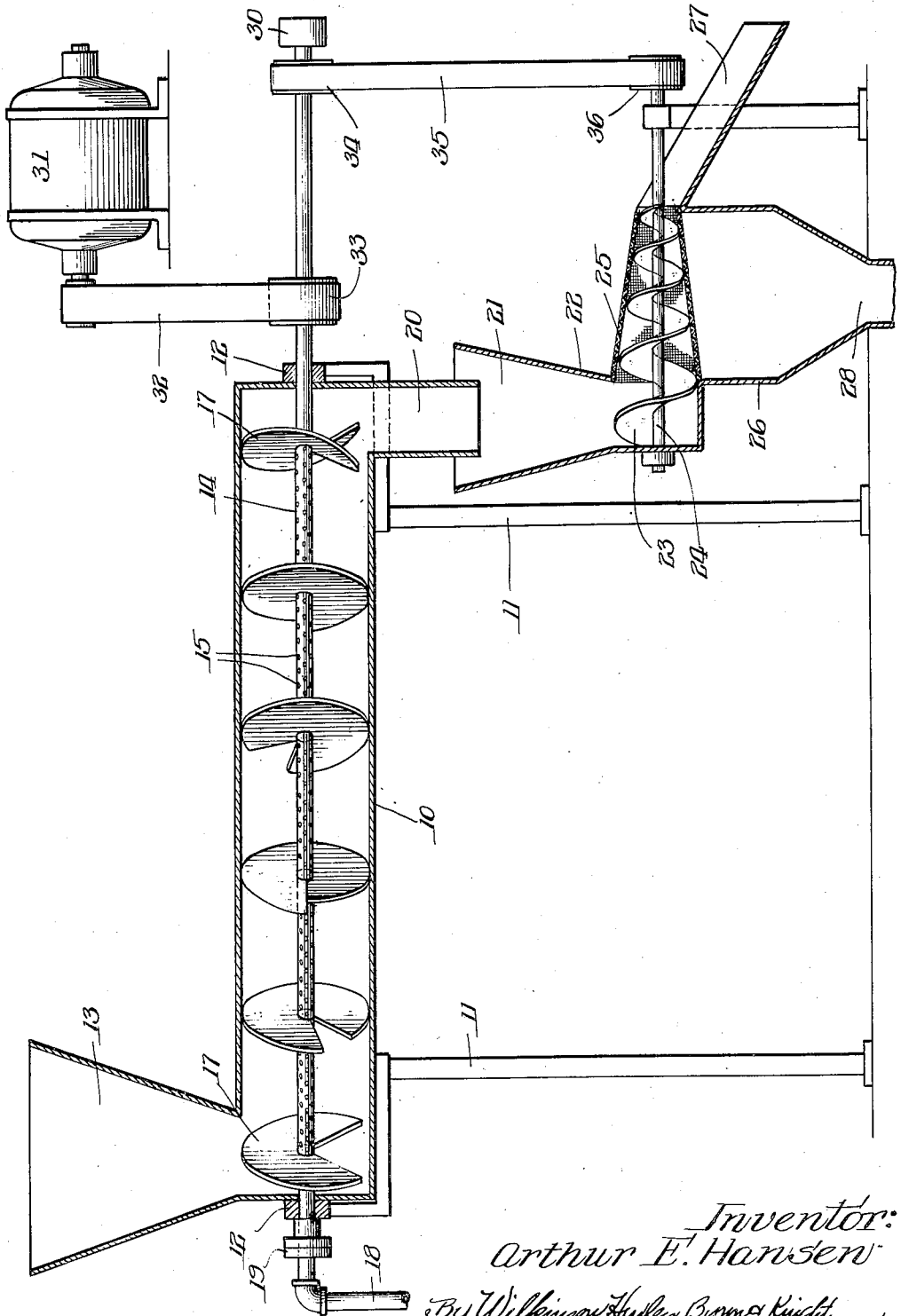
Inventor:
Arthur E. Hansen
By Wilkinson, Huxley, Byrne & Knight
attys.

Patented May 1, 1934

UNITED STATES PATENT OFFICE 1,956,615

METHOD OF PRODUCING TOMATO JUICE

Arthur E. Hansen, Chicago, Ill., assignor to Libby, McNeill & Libby, Chicago, Ill., a corporation of Maine Application April 9, 1931, Serial No. 528,743

6 Claims. (Cl. 99—11)

This invention relates to a novel method for the production of tomato juice.

The process of this invention is based upon the discovery of certain causes for less desirable results in present known methods of producing tomato juice and an understanding of prevailing conditions in production operations and the results produced thereby.

It is an object of the process of this invention to provide a method by which a new and improved tomato juice product is obtained and one which is simple and highly practical in commercial practice.

It is a further object of this invention to provide a process which may be conducted by a simple and relatively cheap mechanism or equipment and is capable of being carried out by a continuous operation whereby the entire process may be conducted in a relatively short period of time requiring only a few minutes from the time the tomatoes are first introduced for treatment until the finished juice is sealed in the cans or other containers.

It is a further object of this invention to provide a process by which an improved juice is prepared, including certain ingredients such as pectin, or other substances extracted from the seeds and skins of the tomatoes, the presence of which results in an improved and desirable flavor and consistency heretofore unattainable in tomato juice manufactured by other processes.

It is a further object of this invention to provide a process by which the juice is extracted and sealed in containers in substantially its original or natural condition entirely free of oxidation or other unavoidable changes in known processes irrespective of the degree of precaution exercised.

The process of this invention is characterized by first; the treatment of the tomatoes including the initial breaking or cutting operation, down to the final introduction and sealing in the cans or other containers, in a substantially non-oxidizing atmosphere. Secondly; the steaming of the tomatoes in their original condition including their skins and seeds, while breaking or slightly cutting the tomatoes so that the steam is permitted to come in contact with all portions thereof whereby to extract from the seeds and skins thereof, certain substances, such as pectin, the presence of which results in an improved, desirable flavor in the final tomato juice. Thirdly; the utilization of the steam for producing the non-oxidizing atmosphere and subjecting the tomatoes to the first breaking or cutting action only when protected from oxidation by the atmosphere of steam.

With these characterizing features in mind, reference will now be made to a practical method by which the invention may be practiced and to assist in the understanding thereof reference will be made to the accompanying drawing which is illustrative of suitable mechanism for practicing the method.

The following description of the apparatus and method will be given in detail for clarity but it is to be understood that this description is given merely by way of example and should not be construed as limiting the invention in any respect.

The scope of the invention should be determined from an understanding of this illustrative embodiment and an appreciation of the advantages produced therein.

In the drawing, the figure is a diagrammatic illustration of a mechanism by which the process of this invention may be practiced.

By referring to the drawing, it will be noted that the apparatus illustrated comprises an elongated cylinder 10, mounted on a suitable frame 11, having bearings 12 at its opposite ends.

At the top and at one end, a hopper 13 is provided through which the tomatoes to be pressed are introduced. A center shaft 14, is provided mounted in the bearings 12, which is preferably constructed as a hollow tube having a plurality of small outlet openings 15 extending throughout the full length thereof. The shaft 14 is intended to serve both as a rotary shaft for the breaking and conveying elements 17 mounted thereon, and as a pipe for conducting steam to the interior of the cylinder 10 through the outlet openings 15. The breaking and conveying elements 17 may be of any suitable construction but good results are produced when each element is formed of a split disc spirally fixed to the shaft so as to present conveying surfaces and also blunt cutting edges for breaking and cutting the tomatoes during the conveying process.

It is found helpful to provide a slight space between adjacent discs so that each element is independent of the other so as to realize a better cutting and breaking action.

The steam may be supplied through a pipe 18 having a tight rotary packing 19 for connecting it to the shaft 14 whereby steam may be introduced into the cylinder 10 during rotation of the shaft. At the opposite end of the cylinder 10, an outlet 20 is provided which feeds directly into the hopper 21 of the juice extractor 22. This extractor is of conventional construction and comprises a conical conveyor screw 23 mounted on a shaft 24 and a screen or mesh work cone 25.

The steamed, cut tomatoes are fed directly into the extractor 22 and are forced by the conveyor, through the conical screen or mesh 25 so that the juice is fed directly into the hopper 26 and the skins, seeds, and pulp to the chute 27. The juice may be taken from the outlet 28 of the hopper 26 and fed directly into a suitable container from which the cans or other individual containers are filled. The amount of pulp which is permitted to remain in the juice is determined by the nature and size of the screen or mesh 25 and therefore, the consistency of the juice may be readily determined by the screen selected.

The apparatus may be driven by any suitable mechanism but by way of illustration, the shaft 14 is here shown extended to a bearing 30 and driven by means of a motor 31, belt 32 and pulley 33 attached to the shaft 14. The shaft 14 may also be provided with pulley 34 for driving belt 35 and pulley 36 attached to shaft 24 of the extractor.

By employing the above described apparatus, it will be observed that tomatoes can be introduced into the hopper 13 at a time when the shaft 14 is in rotation and a substantial quantity of steam is being fed into the cylinder 10 through the holes 15. At the time the tomatoes are introduced they are in their natural condition, that is; wholly intact with their skins unbroken so that all tendency toward oxidation or deterioration is avoided.

The tomatoes at once contact the rotary conveying and breaking element 17 which break and cut the tomatoes while exposed to the substantially non-oxidizing atmosphere of steam.

In practice, it is found that the steam emerging from the openings in the shaft finds its way to both ends of the cylinder and escapes both through the inlet and outlet openings and that the steam displaces substantially all of the air which would normally occupy the space within the cylinder. The tomatoes are thus broken and fed along the cylinder 10 in contact with the steam which serves to soften the tomatoes to some extent and to extract certain constituents such as pectin from the seeds and skin. The steam treatment at this time, assures the recovery of the pectin from the seeds and skin and this eliminates the possibility of discarding these desirable ingredients with the skins, seeds, and pulp after the juice extraction operation.

As above mentioned, these constituents such as pectin, extracted from the seeds and skin, result in a highly improved and desirable flavor in the final tomato juice product. The passage of the tomatoes through the cylinder 10 is continuous and involves only a short period of time after which it is continuously fed into the extractor where the juice is separated from the skin, seeds, and part of the pulp. Similarly the juice is fed continuously through the extractor and thence to any suitable container where the canning or filling operations may be conducted simultaneously and by continuous process.

This process has been put into actual practice and good results have been obtained by the use of the mechanism here disclosed, in which the entire operation was conducted in a period of approximately three minutes.

The superior product is attributable to this novel process which effects the entire operation in a substantially non-oxidizing atmosphere in a relatively short period of time whereby no oxidation or other deterioration of the juice is permitted.

Furthermore, by breaking and steaming the tomatoes prior to the juice extracting process, the steam serves not only as a non-oxidizing atmosphere but as a means for extracting constituents from the seeds and skins such as pectin, which greatly improves the flavor and consistency of the finished product.

Best results are obtained if only the best ripe tomatoes are used, free from imperfections of any sort.

I claim:

1. The method of preparing tomato juice which comprises simultaneously crushing and stirring whole unbroken tomatoes in a substantially non-oxidizing atmosphere of steam so as to expose substantially all portions of said tomatoes to the action of said steam, and subsequently separating the skin, seeds, and a portion of the pulp from the mass so treated without substantial exposure to air.

2. The method of preparing tomato juice which comprises simultaneously crushing and stirring whole unbroken tomatoes in a substantially non-oxidizing atmosphere of steam so as to expose substantially all portions of said tomatoes to the action of said steam, and subsequently separating the skin, seeds, and a portion of the pulp from the mass so treated by a pressing operation, without substantial exposure to air.

3. The herein described process which comprises continuously supplying unbroken tomatoes and causing said tomatoes to travel continuously in an elongated relatively thin stream in a substantially non-oxidizing atmosphere of steam, crushing and stirring said tomatoes in said travelling stream to alter the physical characteristics thereof and thereby exposing substantially all portions thereof to the action of said steam and subsequently separating seeds, skins, and a portion of the pulp from the continuously travelling stream without substantial exposure to air.

4. The herein described process which comprises continuously supplying unbroken tomatoes and causing said tomatoes to travel continuously in an elongated relatively thin stream in a substantially non-oxidizing atmosphere of steam, crushing and stirring said tomatoes in said travelling stream to alter the physical characteristics thereof and thereby exposing substantially all portions thereof to the action of said steam and subsequently separating seeds, skins, and a portion of the pulp from the continuously travelling stream by a pressing operation, without substantial exposure to air.

5. The method of preparing tomato juice which comprises simultaneously crushing and stirring whole unbroken tomatoes in a substantially non-oxidizing atmosphere of steam so as to expose substantially all portions of said tomatoes to the action of said steam, and subsequently separating the skin, seeds, and a portion of the pulp from the mass so treated by a pressing operation, without substantial exposure to air, the entire process being conducted in a relatively short period of time.

6. The herein described process which comprises continuously supplying unbroken tomatoes and causing said tomatoes to travel continuously in an elongated relatively thin stream in a substantially non-oxidizing atmosphere of steam, crushing and stirring said tomatoes in said travelling stream to alter the physical characteristics thereof and thereby exposing substantially all portions thereof to the action of said steam and subsequently separating seeds, skins, and a portion of the pulp from the continuously travelling stream by a pressing operation, without substantial exposure to air, the entire process being conducted in a relatively short period of time.

ARTHUR E. HANSEN.